United States Patent

[11] 3,617,217

| [72] | Inventors | Kenneth W. Heywood |
| | | Overland; |
| | | Charles R. Trampier, Jr., Webster Groves, both of Mo. |
| [21] | Appl. No. | 860,016 |
| [22] | Filed | Sept. 22, 1969 |
| [45] | Patented | Nov. 2, 1971 |
| [73] | Assignee | National Lead Company |
| | | New York, N.Y. |

[54] PREPARATION OF ANATASE TITANIUM DIOXIDE PIGMENT
4 Claims, No Drawings

| [52] | U.S. Cl. | 23/202, 106/300 |
| [51] | Int. Cl. | C01g 23/04, C01g 23/06, C01g 23/08 |
| [50] | Field of Search | 23/202, 117; 106/300 |

[56] References Cited
UNITED STATES PATENTS

| 2,817,595 | 12/1957 | Kalinowski | 23/202 X |
| 2,999,011 | 9/1961 | Olmsted et al. | 23/202 |
| 3,062,673 | 11/1962 | Wigginton | 23/202 X |
| 3,071,439 | 1/1963 | Solomka | 23/202 |
| 3,091,515 | 5/1963 | Dantro et al. | 23/202 |
| 3,403,977 | 10/1968 | Heywood et al. | 23/202 |
| 3,518,053 | 6/1970 | Kolznak et al. | 23/202 |

*Primary Examiner*—Edward Stern
*Attorneys*—Charles F. Kaegebehn, Robert L. Lehman and Robert L. Holiday ABSTRACT: This invention relates in general to a process for preparing a high quality titanium dioxide pigment in which the titanium dioxide is in the anatase crystal form. The process comprises hydrolyzing in a particular manner the titanium values from a titanium sulfate-ferrous sulfate solution in which the concentration of titanium is from 80 to 180 g.p.l. calculated as $TiO_2$ and treating and calcining the hydrate so formed to produce a high grade anatase $TiO_2$ pigment. Using the hydrolysis process of the instant invention, a high grade anatase titanium dioxide pigment may be produced from a titanium sulfate-ferrous sulfate solution without utilizing the conventional crystallization step for removing most of the iron values nor the concentration step for increasing the titanium content in the liquor to at least 200 g.p.l. $TiO_2$.

PREPARATION OF ANATASE TITANIUM DIOXIDE PIGMENT

BACKGROUND OF THE INVENTION

Titanium dioxide pigments are generally produced commercially according to the prior art processes by the so-called "sulfate process" in which a titaniferous material, such a titaniferous iron ore, ore concentrate or a titanium slag is heated at elevated temperatures, with concentrated sulfuric acid to form a porous cake, sometimes referred to in the art as "digestion cake." The digestion cake is allowed to cure so as to effect maximum recoveries of titanium values upon dissolving. After curing, the cake is dissolved in water or weak acid, with agitation, to form a solution of titanium sulfate and iron sulfates. The ferric sulfate values in the solution are converted to ferrous sulfate by the addition, to the solution, of a reducing agent, such as scrap iron with or without antimony oxide. The solution is then clarified by settling and filtration to remove all of the solid material contained in the solution with minimum loss of $TiO_2$.

Following clarification the solution is then usually subjected to a crystallization step to remove most of the ferrous sulfate values as copperas, i.e., $FeSO_4 \cdot 7H_2O$.

After crystallization the titanium sulfate solution is subjected to concentration to remove water from the solution. This is accomplished by evaporation in concentrators which operate under vacuum and at elevated temperatures. Concentration is continued until the specific gravity of the solution is at least 1.5 with a $TiO_2$ content of at least 200 grams per liter and preferably from 250-300 grams per liter.

The concentrated titanium sulfate solution is then converted by hydrolysis, from the soluble state into insoluble $TiO_2$ hydrate and in general this change is effected through dilution of the concentrated titanium sulfate-ferrous sulfate solution with $H_2O$ at elevated temperatures. Thus a predetermined amount of titanium sulfate-ferrous sulfate solution having a $TiO_2$ content of at least 200 grams per liter is preheated to a temperature of at least 90° C. and added at a predetermined rate, with agitation, to clear water at substantially the same temperature and the ratio of 3-19 parts solution to one part water. During subsequent boiling, the precipitated $TiO_2$ forms initially as colloidal particles, which subsequently floc to produce a filterable $TiO_2$ hydrate containing from 30 percent to 36 percent solids.

High quality titanium dioxide pigments have been made from hydrates produced from clarified, concentrated and crystallized titanium sulfate solution. However the above described hydrolysis procedure cannot be employed to produce satisfactory hydrates when a clarified but unconcentrated and uncrystallized titanium sulfate-ferrous sulfate solution is used.

SUMMARY OF THE INVENTION

A high quality titanium dioxide pigment having the crystal structure of anatase may be produced by the process of the instant invention which utilizes a novel hydrolysis procedure which employs a clarified but uncrystallized and unconcentrated titanium sulfate-ferrous sulfate solution having a titanium concentration from 80 to 180 g.p.l. $TiO_2$ a $FeSO_4/TiO_2$ ratio from 2.20 to 2.75 and a $H_2SO_4/TiO_2$ ratio from 1.70 to 2.30.

The process comprises the following steps:

1. provide a measured quantity of the above clarified, uncrystallized and unconcentrated titanium sulfate-ferrous sulfate solution at a temperature from 40° C. to 70° C.;
2. add water to a tank in which the initial hydrolysis will take place, the quantity of water being from 5 percent to 20 percent of the volume of the said measured quantity of titanium solution to be hydrolyzed, said water being heated and agitated to obtain a temperature from 80° C. to 98° C.;
3. add from 1 percent to 5 percent of the total amount of said measured quantity of titanium solution to the water over a period of 60 to 120 seconds;
4. add from 10 percent to 30 percent of remainder of the said measured quantity of titanium solution into the mixture in the tank over a period from 5 to 20 minutes;
5. maintain the temperature of the mixture between 55° C. an 85° C. during the addition period;
6. admixing the above mixture and the remainder of the titanium solution in a tank;
7. the temperature of the final mixture after all of the solutions have been added being between 50° C. and 90° C.;
8. heating the mixture to boil within 20 to 70 minutes;
9. boil the mixture gently from 2 to 4 hours;
10. filter and thoroughly wash the precipitated titanium hydrate;
11. bleach the washed hydrate to reduce the ferric iron values to the ferrous state and after filtering and washing;
12. add water to form a titanium hydrate slurry;
13. treat the slurry with salts of potassium and phosphorous in amount equivalent to 0.3–0.5 percent $K_2O$ and 0.4–0.8 percent $P_2O_5$ on a $TiO_2$ weight basis, the mole proportions of $K_2O:P_2O$ being from 0.9–1.3:1.0;
14. calcine the dewatered slurry to form anatase $TiO_2$ having a spectral characteristic of at least 3.5 with a rutile content of less than 2 percent;
15. and milling calciner discharge to form said anatase pigment.

In the instant process, it should be noted that the nucleating agent formed in step (3) is then stabilized by the addition of 10 percent to 30 percent of the remaining titanium solution in step (4). This stabilized nucleating agent may be prepared ahead of time and used later in various hydrolysis batches since it may be stored for various lengths of time.

In step (6) wherein the stabilized nucleating agent prepared in step (5) is admixed with the remaining titanium solution, it should be explained that the stabilized nucleating solution and the remaining solution may be admixed in any manner. The two solutions may be simultaneously added to an empty tank, the stabilized nucleating solution may be added to the remaining solution or the latter may be added to the former. Although any method of mixing may be used, it is preferred to add the two solutions simultaneously or cocurrently, the stabilized nucleating solution being added over a period of 10 to 15 minutes as the remaining solution is being added over a period of 20 to 40 minutes.

This particular hydrolysis process for preparing anatase titanium dioxide pigment from an unconcentrated, uncrystallized solution is particularly desirable since the seed or nucleating agent may be prepared in advance and may be stored until ready for use in a subsequent hydrolysis batch. In addition the seed or nucleating agent is prepared in situ and therefore does not require the purchase of relatively pure alkali metal compounds which normally are used to prepare outside nuclei.

If it is desirable to produce an anatase pigment having a particularly high spectral characteristic, a holding period of from 1 to 5 minutes between the end of step (3) and the beginning of step (4) is useful.

It has also been discovered that the settling and filtering characteristics may be improved if desired, if the speed of agitation is intensified in step (2) during the initial solution addition in step (3).

When using the instant hydrolysis process for hydrolyzing a clarified but uncrystallized, unconcentrated solution, the titanium hydrate formed apparently possesses the necessary crystallite and floc sizes H. V. that upon treatment and calcination the anatase $TiO_2$ pigment formed possesses the superior pigment properties.

Pigment properties were determined as follows:

The tinting strength was determined by the well-known Reynolds' Tinting Strength Method as described in Physical and Chemical Examination of Paints, Varnishes, Lacquers, and colors by H. V. Gardner, Ninth Edition, May 1939, page 37.

The color brightness and tone were determined by the following methods:

COLOR BRIGHTNESS AND TONE OF PIGMENT

This test determined instrumentally the brightness and tone of the titanium dioxide pigment in a wet film of alkyd vehicle. The pigment was dispersed in a soya alkyd vehicle and the green, red and blue reflectance values of wet film were measured. The green reflectance value was taken as a measurement of the brightness of the pigment and the blue minus red reflectance values as a measure of the color tone. The determinations were made on a Colormaster Differential Colorimeter manufactured by Manufacturers Engineering and Equipment Corp., Hatboro, Pa.

The pigment was mixed with a soya alkyd resin to form a paste and the paste was applied to the surface of a high reflectance white ceramic panel, the thickness of the paste film being sufficient to eliminate the background color. The green, red and blue reflectance values of the film were read on the Colormaster and the reflectances were recorded as percent reflectance.

The spectral characteristic of the pigment was determined as follows:

SPECTRAL CHARACTERISTICS OF PIGMENT IN A PAINT VEHICLE

The pigment was mixed with a soya alkyd vehicle containing carbon black and the mixture was formed into a paste. The ratio of the pigment to carbon black present in the paste was 5 to 0.15. The paste was then spread onto a lacquered sheet and the wet film was immediately tested in the Colormaster Colorimeter described above. The blue and red reflectance values were obtained. The spectral characteristics of the pigment was measured by comparing the result obtained by subtracting the red from the blue reflectance values and comparing this result with the spectral characteristics of a standard pigment previously determined.

In order to describe more fully the process of the instant invention, the following examples are presented:

EXAMPLE 1

Two hundred cu. ft. of water heated to 91° C. were placed into a precipitation tank. With agitation 40 cu. ft. of clarified but uncrystallized, unconcentrated titanium sulfate-ferrous sulfate solution at 50° C. were added to the water within 90 seconds. 40 cu. ft. of the sulfate solution represents 2 percent of the total amount of solution to be hydrolyzed. The solution employed has the following analysis:

| | |
|---|---|
| Specific Gravity at 60° C. | 1.530 |
| $TiO_2$ (%) | 8.6 |
| $H_2SO_4$ (%) (to methyl orange) | 16.5 |
| $FeSO_4$ (%) | 20.0 |
| $H_2SO_4/TiO_2$ | 1.88 |
| $FeSO_4/TiO_2$ | 2.48 |
| Red. $TiO_2$, gpl. | 3.0 |

Immediately after the initial solution had been added, 400 cu. ft. of the titanium solution were added to the tank over a period of 7 minutes to stabilize the nuclei. This amount of solution represented 20 percent of the total amount of solution. The temperature of the mixture at the end of the addition period was 80° C.

This stabilized solution was then added simultaneously with the remaining 1560 cu. ft. of titanium solution to a tank, the time of addition of the stabilized solution was 11 minutes while the time of addition of the remainder of the titanium solution was 28 minutes.

Steam was added to heat the mixture and at the end of the solution addition the temperature of the mixture was 82° C. The mixture was heated to a boil in 35 minutes and was boiled for 3 hours after which the precipitated hydrate was allowed to settle, the liquor removed and the hydrate was washed and thoroughly bleached to remove the iron and other coloring impurities. In this particular example the iron in the hydrate was reduced to 0.003 percent $Fe_2O_3$ which is below the upper limit of 0.005 percent $Fe_2O_3$.

The washed and bleached titanium hydrate was then slurried with water to obtain 30 percent solids. The slurry was then treated with 0.45 percent $K_2O$ (added as 10 percent $K_2SO_4$ solution) and 0.65 percent $P_2O_5$ (added as 75 percent $H_3PO_4$) the percentages based on the amounts retained in the hydrate and based on the weight of $TiO_2$ in the slurry. After agitating the treated slurry for one hour, the slurry was filtered and the treated hydrate was introduced into the calciner.

The hydrate was calcined for 100 minutes at 950° C. after which the calcined $TiO_2$ was thoroughly milled. The milled pigment has the following properties:

| | |
|---|---|
| % Reflectance | 95.5 |
| Tone | −3.9 |
| Reynolds Tinting Strength | 1,225 |
| Spectral Characteristics | 4.0 |

EXAMPLES 2-4

The procedure of example 1 was repeated in these examples except that the nuclei was stabilized with varying amounts of the titanium solution. In example 2, 10 percent of the remaining solution was used while 30 percent was used in example 3. In example 4 has the stabilized nucleating solution was held for 2 hours before being used in the final hydrolysis step. In all of these examples the stabilized nucleating solution was added simultaneously to a tank with the remaining solution.

The operational details and the results obtained of each of these examples along with those of example 1 are recorded in the following table.

EXAMPLES 5-6

In these examples the procedure of example 1 was used except that the stabilized nucleating solution and the remaining titanium solution were not added simultaneously to the precipitation tank. In example 5 the stabilized nucleating solution was added the remaining titanium solution which had been previously placed in the precipitation tank while in example 6 the stabilized nucleating solution was first placed in the precipitation tank and the remaining titanium solution was added to the stabilized nucleating solution.

The results of these runs along with the operational details are recorded in the table.

TABLE I

| Hydrolysis | Example Number | | | | | |
|---|---|---|---|---|---|---|
| | 1 | 2 | 3 | 4 | 5 | 6 |
| Amount of $H_2O$ Used cu., ft. | 200 | 200 | 200 | 200 | 200 | 200 |
| Temp. of $H_2O$, ° C. | 91 | 91 | 90 | 91 | 91 | 91 |
| Amount of solution, added initially, cu. ft | 40 | 40 | 40 | 40 | 40 | 40 |
| Amount of solution, added initially, percent | 2 | 2 | 2 | 2 | 2 | 2 |
| Temperature of solution, ° C | 50 | 48 | 55 | 50 | 50 | 50 |
| Time of addition, seconds | 90 | 88 | 100 | 100 | 90 | 90 |
| Amount of solution added, to stabilize the nuclei, cu. ft. | 400 | 200 | 600 | 400 | 400 | 400 |
| Amount of solution added to stabilize the nuclei, percent | 20 | 10 | 30 | 20 | 20 | 20 |
| Temperature of mixture, ° C | 80 | 81 | 78 | 80 | 80 | 80 |
| Time of addition, min | 7 | 5 | 11 | 7 | 7 | 7 |
| Method of admixing nucleating solution and remaining titanium solution | (1) | (1) | (1) | (1) | (2) | (3) |
| Amount of remaining solution added, cu. ft. | 1,560 | 1,760 | 1,360 | 1,560 | 1,560 | 1,560 |

Table 1—Continued

|  |  |  |  |  |  |  |
|---|---|---|---|---|---|---|
| Time of addition, minutes | 28 | 23 | 24 | 28 |  | 28 |
| Amount of stabilized solution added, cu. ft | 640 | 440 | 840 | 840 | 640 | 640 |
| Time of addition, minutes | 11 | 7 | 14 | 11 | 11 |  |
| Time to heat to boil, minutes | 35 | 35 | 35 | 35 | 45 | 40 |
| Time at boil, hours | 3 | 3 | 3 | 3 | 3 | 3 |
| Treating agents: |  |  |  |  |  |  |
| $K_2O$, percent | 0.45 | 0.45 | 0.45 | 0.45 | 0.45 | 0.45 |
| $P_2O_5$ | 0.65 | 0.65 | 0.65 | 0.65 | 0.65 | 0.65 |
| Calcination: |  |  |  |  |  |  |
| Temperature, °C | 950 | 950 | 950 | 950 | 950 | 950 |
| Time, minutes | 100 | 100 | 100 | 100 | 100 | 100 |
| Pigment properties: |  |  |  |  |  |  |
| Reflectance percent | 95.5 | 95.5 | 95.6 | 96.0 | 95.6 | 95.6 |
| Tone | −3.9 | −4.1 | −3.8 | −3.9 | −3.7 | −4.1 |
| Reynolds tinting strength | 1,225 | 1,200 | 1,225 | 1,225 | 1,225 | 1,200 |
| Spectral characteristics | 4.0 | 4.0 | 3.9 | 4.4 | 5.4 | 4.3 |

[1] Simultaneously.
[2] Stabilizing nucleating solution added to remaining Ti. Solution.
[3] Remaining Ti. solution added to stabilized nucleating solution.

We claim:

1. A process for producing a high quality titanium dioxide pigment having the crystal structure of anatase which comprises providing an uncrystallized and unconcentrated titanium sulfate-ferrous sulfate solution at temperature of 40°–70° C., having a titanium concentration from 80 to 180 g.p.l. $TiO_2$, a $FeSO_4/TiO_2$ ratio from 2.20 to 2.75 and a $H_2SO_4/TiO_2$ ratio from 1.70 to 2.30, adding water to a tank in which the hydrolysis will take place, the quantity of water being from 5 percent to 15 percent of the volume of the titanium solution to be hydrolyzed, heating and agitating the water to obtain a temperature from 80° C. to 98° C., adding from 1 percent to 5 percent of the total amount of said measured quantity of titanium solution to the agitated water over a period of 60 to 120 seconds to form a nucleating agent, adding from 10 percent to 30 percent of the said remainder of the said measured quantity of titanium solution into the mixture to stabilize the nucleating agent in the tank over a period of from 5 to 20 minutes, maintaining the 20 of the mixture between 55° C. and 85° C. during the addition period, admixing the above stabilized nucleating mixture with the remainder of the titanium solution in a tank, the temperature of the final mixture after all of the solutions have been added being from 50° C., to 90° C., raising the temperature of the mixture to a boil within 20 minutes to 70 minutes after the end of the addition period, boiling gently the mixture from 2 to 4 hours, filtering the thoroughly washing the precipitated titanium hydrate, bleaching the washed hydrate to reduce the ferric iron values to the ferrous state and after filtering and washing, adding water to form a slurry, treating the slurry with salts of potassium and phosphorous, in amount equivalent to 0.3–0.5 $K_2O$ and 0.4–0.8 $P_2O_5$ on a $TiO_2$ weight basis, the mole proportions of $K_2O:P_2O_5$ being from 0.9–1.3:1.0, dewatering the slurry and calcining the dewatered slurry to form anatase $TiO_2$ having a spectral characteristic of at least 3.5 with a futile content of less than 2 percent and milling the calciner discharge to form said anatase pigment.

2. Method according to claim 1 in which the stabilized nucleating agent is added simultaneously with the remaining titanium solution to a precipitation tank, the time of addition of said stabilized nucleating agent being from 10 to 15 minutes and the time of addition of the remainder of the titanium solution being from 20 to 40 minutes.

3. Method according to claim 1 in which the stabilized nucleating agent is added to the remainder of the titanium solution.

4. Method according to claim 1 in which the remainder of the titanium solution is added to the stabilized nucleating agent.

While this invention has been described and illustrated by the examples shown, it is not intended to be strictly limited thereto, and other variations and modifications may be employed within the scope of the following claims.